3,394,143
HETEROCYCLEETHANOLS
Milton Wolf, West Chester, Pa., assignor to American Home Products Corporation, New York, N.Y., a corporation of Delaware
No Drawing. Continuation-in-part of abandoned application Ser. No. 502,642, Oct. 22, 1965. This application July 18, 1967, Ser. No. 654,075
4 Claims. (Cl. 260—308)

ABSTRACT OF THE DISCLOSURE

Triazole and benzotriazole ethanols are prepared by reacting selected triazoles with an epoxy compound under solvent refluxing conditions. The compounds have been found to demonstrate useful pharmacological activity, as central nervous system depressants, as anti-convulsants and as anti-inflammatory agents.

---

This application is a continuation-in-part of application Ser. No. 502,642, filed Oct. 22, 1965, and now abondoned.

The invention relates to lower alkanol derivatives and more specifically to heterocycleethanols demonstrating pharmacological activity.

The compounds of the invention may be broadly illustrated by the following structural formula:

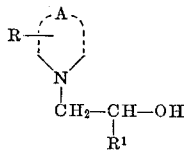

wherein the ring moiety

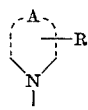

is intended to represent a triazole or a benzotriazole, which may have one or more substituents such as lower alkyls or halogens, represented by R, while the designation $R^1$ is intended to stand for an aryl or aryloxyalkyl group.

More specifically and preferably, $R^1$ represents unsubstituted phenyl, phenoxymethyl (lower) alkylphenoxymethyl or halophenoxymethyl. The acid-addition salts of the basic compounds are also intended to be included within the scope of the invention.

The compounds are prepared by reacting a selected nitrogen-containing heterocyclic with an epoxy compound, for example, styrene oxide in a benzenoid solvent, preferably xylene, under solvent refluxing conditions for sufficient time for reaction to become completed, usually for about 4 to 24 hours.

The desired product is easily separated on cooling, either as a solid, or in the form of an oil which may be concentrated and purified.

The compounds of the invention are useful by reason of their pharmacological actions, demonstrating a common central nervous system activity, specifically depressant action. Moreover, the triazole ethanols of the invention show substantial anti-convulsant activity while the benzotriazoles ethanols have been found to have anti-inflammatory action. Such actions are noted whether the compounds are used as bases or in the form of pharmaceutically acceptable acid-addition salts.

To form salts, the selected base is reacted in known manner with an acidic component, typical mineral acids being phosphoric, hydrohalic or sulfuric acid, but organic acid-addition salts are also contemplated, these being formed by reaction with common organic acids, for example, acetic, tartaric, succinic or maleic acids.

The compounds of the invention are generally used in solid or liquid preparations, either in the form of tablets or in powder form, or in solution or suspension. Usually an inert carrier is used, for example, lactose, starch or talc when the material is in tablet form, or an aqueous or oleagenous carrier when made up as a solution or suspension for oral or parenteral use in the manner acceptable in the art.

The compounds of the invention are specifically useful in the field of comparative pharmacology. When the triazole ethanols are used and compared with other drugs as anti-convulsants they will demonstrate this action best when utilized at a dose (orally in mice) within the range of about 100 to 400 mg./kg. and preferably at 127 to 210 mg./kg. Furthermore, when the benzotriazoles of the invention are used in the field of comparative pharmacology for anti-inflammatory effects in rats, they will demonstrate this utility best against comparable drugs at an oral dose of about 40 to 50 mg./kg. When the compounds of the invention are used in comparative pharmacology as central nervous system depressants, they are best used intraperitoneally in mice in a dosage range of about 125 to 400 mg./kg.

The following examples are intended to illustrate the preparation of compounds of the invention in greater detail:

Example 1.—5-methyl-α-phenylbenzotriazole-1-ethanol

Reflux overnight a mixture of 23.8 g. styrene oxide and 26.4 g. 5-methylbenzotriazole in 50 ml. of xylene, separating the product obtained, having a M.P. 132.5–133.5° C.

Analysis.—Calc'd for $C_{15}H_{15}N_3O$: C, 71.12; H, 5.97; N, 16.59. Found: C, 70.87; H, 6.14; N, 16.35.

Example 2.—5-methyl-α-phenoxymethylbenzotriazole-1-ethanol

Following the same procedures, react 5-methylbenzotriazole and 1,2-epoxy-3-phenoxypropane. The title product has a M.P. 111.5–113° C.

Analysis.—Calc'd for $C_{16}H_{17}N_3O_2$: C, 67.82; H, 6.04; N, 14.83. Found: C, 68.02; H, 5.83; N, 14.97.

Example 3.—α-Phenyl-1H-1,2,4-triazole-1-ethanol

Reflux for 4 hours a suspension of 5 g. of 1,2,4-triazole in 125 ml. of xylene to which is added 8.7 g. of styrene oxide. An oil separates on cooling. Remove the xylene layer and concentrate in vacuo. Separate the solid product and recrystallize from ethyl acetate-hexane, M.P. 113–115° C.

Analysis.—Calc'd for $C_{10}H_{11}N_3O$: C, 63.49; H, 5.86; N, 22.21. Found: C, 63.30; H, 5.86; N, 21.91.

Example 4.—3,5-dimethyl-α-phenoxymethyl-1H-1,2,4-triazole-1-ethanol

Reflux a mixture of 3 g. of 3,5-dimethyl-1,2,4-triazole and 4.6 g. of 1,2-epoxy-3-phenoxypropane in 40 ml. of benzene for 24 hours. Cool and separate crystals, recrystallizing from ethyl acetate-cyclohexane. Yield 5 g. M.P. 130–132° C.

Analysis.—Calc'd for $C_{13}H_{17}N_3O_2$: C, 63.14; H, 6.93; N, 16.99. Found: C, 63.42; H, 6.91; N, 17.02.

Example 5.—3,5-dimethyl-α-(o-tolyloxymethyl)-1H-1,2,4-triazole-1-ethanol

Following the procedure of Example 4, use 1,2-epoxy-3-o-tolyloxypropane in place of the preceding epoxy compound. The title product has a M.P. 182.5–184° C.

*Analysis.*—Calc'd for $C_{14}H_{19}N_3O_2$: C, 64.35; H, 7.33; N, 16.08. Found: C, 64.65; H, 7.17; N, 15.77.

Example 6.—α-(p-Chlorophenoxymethyl)-3,5-dimethyl-1H-1,2,4-triazole-1-ethanol

Follow the method of Example 4, but use 1,2-epoxy-3-p-chlorophenoxypropane in place of the epoxy-phenoxy compound. The product, crystallized out of cyclohexane, will have a M.P. 108–110° C.

*Analysis.*—Calc'd for $C_{13}H_{16}ClN_3O_2$: C, 55.42; H, 5.73; N, 14.91. Found: C, 55.62; H, 5.68; N, 15.12.

Example 7.—3,5-dimethyl-α-phenyl-1H-1,2,4-triazole-1-ethanol

Following the procedure of Example 4 but using styrene oxide and 3,5-dimethyl-1,2,4-triazole, one will obtain the title product, M.P. 183–184° C. when crystallized out of tetrahydrofuran.

*Analysis.*—Calc'd for $C_{12}H_{15}N_3O$: C, 66.33; H, 6.96; N, 19.35. Found: C, 66.22; H, 6.85; N, 19.66.

The invention claimed is:

1. A compound having the formula:

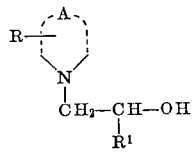

wherein the ring configuration

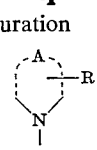

stands for a nitrogen-containing heterocyclic ring selected from the group consisting of triazole, and benzotriazole, with R reperesenting hydrogen or one to two methyl substituents on the heterocyclic ring, while $R^1$ represents a member of the group consisting of phenyl and chlorophenoxymethyl; and the pharmaceutically acceptable acid-addition salts thereof.

2. As a compound of claim 1; α-phenyl-1H-1,2,4-triazole-1-ethanol.

3. As a compound of claim 1; α-(p-chlorophenoxymethyl)-3,5-dimethyl-1H-1,2,4-triazole-1-ethanol.

4. As a compound of claim 1; 5-methyl-α-phenylbenzotriazole-1-ethanol.

References Cited

UNITED STATES PATENTS 2,800,487   7/1957   Mark _____ 260—308

OTHER REFERENCES

Wiley et al.: Chem. Abstracts, vol. 50, pages 3417–3418 (1956).

ALTON D. ROLLINS, *Primary Examiner.*